April 5, 1938.  C. W. CRUMRINE  2,113,318

CAMERA BODY SHUTTER RELEASE

Filed June 26, 1937

Chester W. Crumrine
INVENTOR

BY *Newton M. Pennie*
*George A. Gillette, Jr.*
ATTORNEYS

Patented Apr. 5, 1938

2,113,318

UNITED STATES PATENT OFFICE 2,113,318

CAMERA BODY SHUTTER RELEASE

Chester W. Crumrine, Rochester, N. Y., assignor to Eastman Kodak Company, Rochester, N. Y., a corporation of New Jersey Application June 26, 1937, Serial No. 150,570

13 Claims. (Cl. 95—53)

The present invention relates to improvements in a camera body shutter release and more particularly to automatic retraction of a manually operable member of a shutter actuating mechanism on the camera body by a means upon the movable support of a folding camera.

Shutter actuating mechanisms with a finger member on the camera body are already known and it is also recognized that such finger members may be automatically retracted into the camera body upon closing of a movable support or folding bed.

The primary object of the present invention is the provision of a cam means on the movable support or folding bed for causing automatic retraction of the finger member on the camera body when said support is moved to closed position. Another object of the invention is the provision of an actuator rod movable longitudinally of the folding bed and having an arcuate portion for causing retraction of the finger member on the body when the bed is closed.

A further object of the invention is the provision of a cam member directly on the folding bed for causing automatic retraction of the finger member on the body when the bed is closed.

Other and further objects of the invention will be suggested to those skilled in the art by the description which follows.

The above and other objects of the invention are obtained upon a photographic camera, comprising a camera body, a support movably mounted thereon, a shutter assembly on the support and an actuator for moving an operating arm of the shutter assembly, which is also provided with a manually operable means on the camera body and connected to the actuator, and a cam means mounted for movement with the support and arranged to engage and move the manually operable means for retraction toward the camera body when the support is moved to closed position.

Reference is hereby made to the accompanying drawing wherein similar reference characters designate similar elements and wherein.

Figure 1:
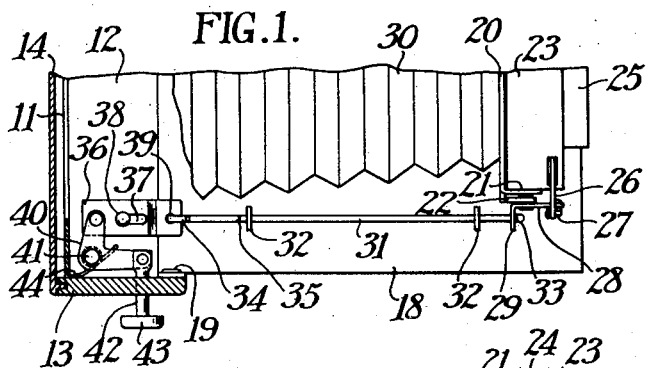
Fig. 1 is a partial plan view of a folding camera provided with an automatically retracting shutter actuating means according to the invention.

My improved shutter actuating means is especially applicable to a photographic camera of the folding type and comprising a camera body, a folding bed and a shutter assembly.

The camera body comprises a front body member 10 having an inner frame member 11, a horizontal mechanism plate 12, and a side wall 13. A cover 14 is pivotally connected by a hinge 15 to front body member 10 to enclose the spool chamber 16 containing the spool 17.

A movable support or folding bed 18 is hinged to side wall 13 by pivots 19 and is adapted to cover the bellows and shutter assembly recess in the camera body when moved to closed position.

The shutter assembly comprises a front plate 20 having ears 21 and a lug 22, a photographic shutter 23 mounted by pins 24 between ears 21, and a photographic objective 25. The photographic shutter 23 has an operating arm 26 connected by a link 27 to one end of a bell crank 28 which is pivotally mounted upon lug 22 and which has a second operating arm 29. Clockwise rotation of bell crank 28 moves link 27 and arm 26 downwardly for operation of shutter 23.

A folding bellows 30 is connected between inner frame member 11 and front plate 20. The shutter assembly including photographic objective 25 and the bellows 30 may in a known manner be folded into the camera body and covered by folding bed 18. In fact, all of the camera details thus far disclosed are well known in the art.

The shutter actuating mechanism comprises an actuator mounted upon the folding bed and a manually operable means mounted on the camera body. The actuator may comprise a pull rod 31 slidably mounted in brackets 32 on the bed 18. Said pull rod 31 includes at one end an upright portion 33 adapted to engage the operating arm 29 of bell crank 28 and includes at the other end an arcuate portion 34. A shoulder 35 is also provided in pull rod 31 for a purpose to be later described.

The manually operable means on the camera body may comprise a slide 36 which is provided with a slot 37 and which is slidably mounted upon mechanism plate 12 by a headed pin 38 engaging the slot 37 therein. One end of slide 36 is provided with a hole 39 through which the arcuate portion 34 of pull rod 31 extends. A bell crank 40 is mounted upon the mechanism plate 12 by a stud 41, has one arm pivotally connected to the other end of slide 36 and has the other arm pivotally connected to a finger member including a rod 42 and a button 43, said rod 42 being slidable within an opening in the side wall 13 of the camera body. A coil spring 44 encircles stud 41, has one end engaging bell crank 40 and the other end engaging side wall 13 to create a normal tendency on the manually operable means so that the finger member is normally extended from the camera body or the side wall 13 thereof. It is obvious that the normal extension of the finger member may be accomplished by attaching a resilient means to any other point of the shutter actuating mechanism.

Figure 2:
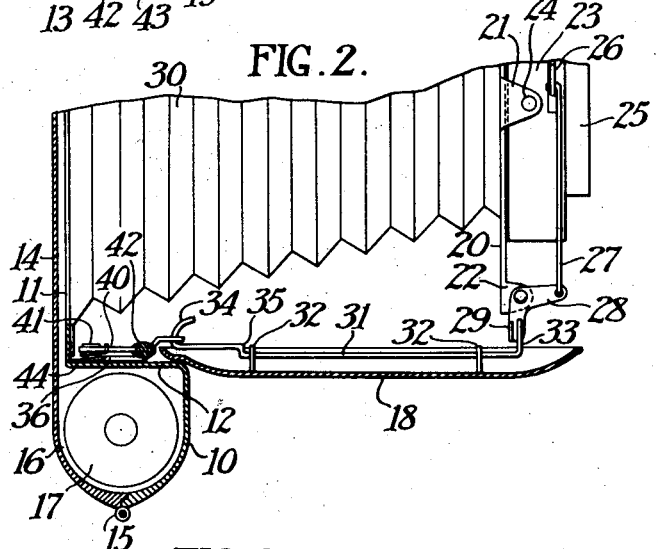
Fig. 2 is a side elevation in partial section of a folding camera so equipped.
Figure 4:
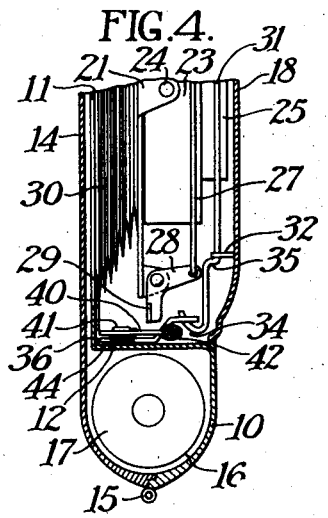
Fig. 4 is a fragmentary vertical section showing the shutter actuating mechanism in retracted position and the camera bed in closed position.
Figures 5, 6:
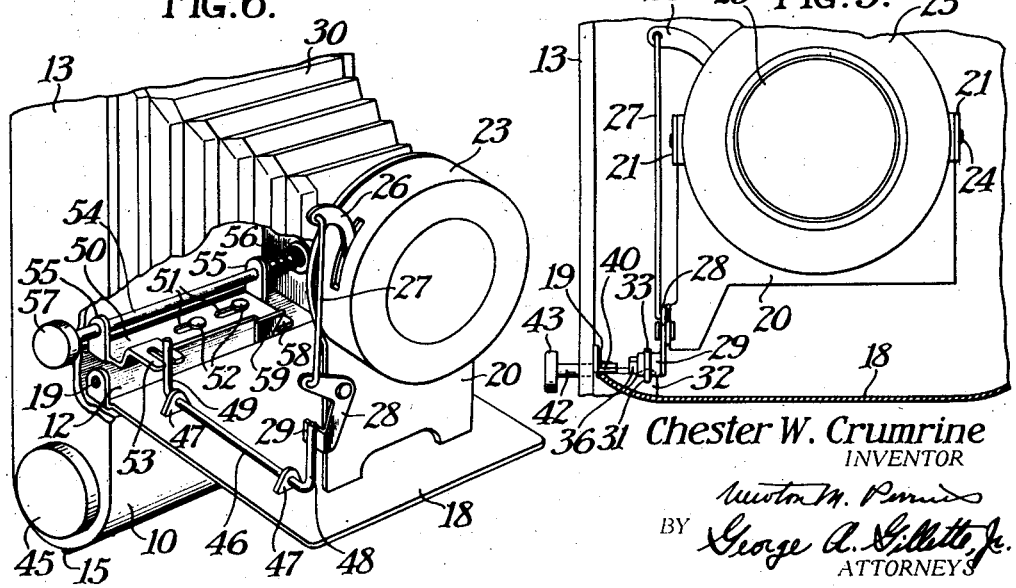
Fig. 5 is a partial front elevation of a folding camera equipped with a shutter actuating mechanism according to the invention.
Fig. 6 is a perspective view of a modified form of the automatically retracted shutter actuating means of the invention.

When the folding bed 18 is moved to open position, the shutter assembly assumes the position shown in Figs. 1, 2 and 5. Depression or retraction of the button 43 toward the side wall 13 of the camera body will cause counter-clockwise rotation of bell crank 40, rearward movement of slide 36 and pull rod 31 whereupon the upright portion 33 of pull rod 31 will rotate the operating arm 29 and cause operation of the photographic shutter 23. The finger member or button 43 returns normally to extended position when the finger pressure thereon is discontinued. In this manner the shutter actuating mechanism may be repeatedly operated in a known manner.

Figure 3:
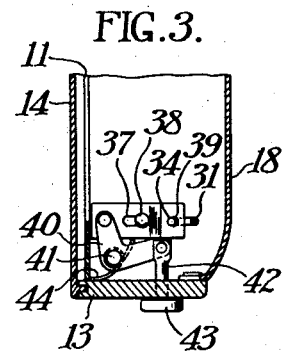
Fig. 3 is a fragmentary horizontal section showing the automatically retracted shutter actuating mechanism in retracted position when the camera body is closed.

When the folding bed 18 is moved to closed position, the shutter assembly is folded into the recess of the camera body and the upright portion 33 of pull rod 31 becomes inoperative with respect to the operating arm 29 of the shutter operating linkage so that depression of the finger member or button 43 cannot cause operation of the shutter 23 when the bed 18 is folded or even after folding movement of bed 18 has been commenced. As the bed 18 is rotated the arcuate portion 34 of pull rod 31 will act to cam the slide 36 rearwardly with respect to mechanism plate 12. At the same time the bell crank 40 will be rotated in a counter-clockwise direction and the finger member composed of rod 42 and button 43 will be retracted toward the side 13 of the camera body or will be moved into the position illustrated in Fig. 3. Such retracting action will be opposed by the coil spring 44 and although the frictional engagement between pull rod 31 and brackets 32 may be sufficient to overcome the action of coil spring 44, it is preferable to relatively position one of the brackets 32 and the shoulder 35 of pull rod 31 so that said shoulder 35 abuts the bracket 32 to prevent any forward movement of the pull rod 31 during closing of the bed 18. In other words, at the beginning of the closing movement for bed 18, shoulder 35 will abut the rear bracket 32 and further closing movement of the bed will cause the arcuate portion 34 to move the slide 36 rearwardly in spite of the action of the coil spring 44 and the finger member will be retracted into the camera body. Upon opening of the folding bed 18 the action of arcuate portion 34 and/or coil spring 44 will move slide 36 forwardly and extend the finger member or rod 42 and button 43 from the side wall 13 of the camera body. Thus a finger member which is automatically retracted by a cam means on the folding bed when the same is closed and which is automatically extended when the bed is open, is realized.

Another form of my invention will be described in connection with Fig. 6. As before, the camera body comprises a front body member 10, a mechanism plate 12, and side wall 13. A winding key 45 is provided on side wall 13 for rotating the film spool within the camera body. Also again the folding bed 18 is hinged by pivots 19 to side wall 13 and supports a front plate 20 on which the photographic shutter 23 is carried and to which the bellows 30 is connected. The shutter assembly also includes an operating arm 26, a link 27, a bell crank 28 pivoted on front plate 20 and including an operating arm 29.

The actuator comprises a rod 46 mounted in brackets 47 on folding bed 18 for rotation about an axis extending longitudinally of said bed 18. An upright portion 48 of rod 46 is adapted to operate arm 29 of the shutter operating linkage, while a second upright portion 49 at the rear of rod 46 is connected to the manually operable means on the camera body.

The manually operable means on the camera body may comprise a slide 50 which is provided with slots 51 engaging headed studs 52 on mechanism plate 12 so that slide 50 moves transversely of the camera body. A jaw 53 is turned up from slide 50 and engages the rear upright portion 49 of rod 46. The manually operable means on the camera body also includes a finger member composed of a rod 54 attached to ears 55 of slide 50 and extending through the side wall 13 of the camera body. A coil spring 56 encircles rod 54 between one side wall 13 and one of the ears 55 so that slide 50, rod 54 and a button 57 on the end thereof are normally urged to a position in which rod 54 and button 57 extend from side wall 13. As before, the coil spring or other resilient means may be connected at any convenient point of the shutter actuating mechanism.

The slide 50 also includes a projection 58 extending toward the folding bed 18. A cam member 59 is mounted on folding bed 18 and may be integral therewith. Said cam member 59 has an inclined edge engaging the projection 58 on slide 50 and is arranged so that when the bed 18 is folded to closed position projection 58 and slide 50 are moved to retract rod 54 and button 57 toward the side wall 13 of the camera body against the action of coil spring 56. At the same time upright portion 48 of actuator rod 46 is displaced from operating arm 29 of the shutter operating linkage so that operation of button 57 will not cause actuation of the photographic shutter after folding of bed 18 has been started. Again a cam means on the folding bed functions to retract the finger member or button 57 of a manually operable means on the camera body when the bed is moved to closed position and again said finger member is extended from the camera body automatically upon movement of the folding bed 18 to open position.

Since the present invention may be varied considerably without departing from the spirit of the invention, the present disclosure is to be construed merely as illustrative and the scope of the invention is defined in the appended claims.

Having now particularly described my invention, what I desire to secure by Letters Patent of the United States and what I claim is:

1. In a photographic camera, the combination with a camera body, a support mounted on said camera body for movement to open and closed positions, and a shutter assembly carried by said support and including an operating arm, of an actuator mounted for movement with respect to said support and arranged, when said support is in open position, to engage and actuate the shutter operating arm but inoperative with respect to said arm when the support is being moved to closed position, a manually operable means on said camera body connected to said actuator and including a finger member, a resilient means operating upon said finger member normally to extend the same from said camera body, and a cam means mounted for movement with said support and arranged to engage and move said manually operable means for retraction of said finger member toward the camera body when said support is moved to closed position but permitting said resilient means to extend said finger member from the camera body when said support is moved to open position.

2. In a photographic camera, the combination with a camera body, a support mounted on said camera body for movement to open and closed positions, and a shutter assembly carried by said support and including an operating arm, of an actuator movably mounted upon said support and for actuating said shutter operating arm, a manually operable means on said camera body connected to said actuator and including a finger member normally extending from said camera body, and cam means mounted for movement with said support and arranged to engage and move said manually operable means for retraction of said finger member toward the camera body when said support is moved to closed position.

3. In a photographic camera, the combination with a camera body, a folding bed hinged to said camera body for movement to open and closed positions, and a shutter assembly carried by said bed and including an operating arm, of an actuator movably mounted upon said bed and operative to actuate said shutter operating arm when said bed is in open position, a manually operable means on said camera body connected to said actuator and including a finger member slidably mounted in said camera body, a resilient means connected to said manually operable means and for normally moving said finger member to extend from said camera body, and a cam means mounted for movement with said folding bed and arranged to engage and move said manually operable means for retraction of said finger member toward the camera body when said folding bed is moved to closed position.

4. In a photographic camera, the combination with a camera body, a support mounted on said camera body for movement to open and closed positions, and a shutter assembly carried by said support and including an operating arm, of an actuator mounted for movement with respect to said support and arranged, when said support is in open position, to engage and actuate the shutter operating arm but inoperative with respect to said arm when the support is being moved to closed position, a manually operable means on said camera body connected to said actuator and including a finger member, a resilient means operating upon said finger member normally to extend the same from said camera body, and a cam means mounted for movement with said support and arranged to engage and hold said manually operable means with said finger member in retracted position with respect to said camera body when said support is in closed position but permitting said resilient means to eject said finger member from said camera body when said support is moved to open position.

5. In a photographic camera, the combination with a camera body, a support mounted on said camera body for movement to open and closed positions, and a shutter assembly carried by said support and including an operating arm, of an actuator mounted for movement with respect to said support and arranged, when said support is in open position, to engage and actuate the shutter operating arm but inoperative with respect to said arm when the support is being moved to closed position, a manually operable means on said camera body including a member slidably mounted thereon and connected to said actuator and including a finger member, a resilient means operating upon said finger member normally to extend the same from said camera body, and a cam means mounted for movement with said support and arranged to engage and move said manually operable means for retraction of said finger member toward the camera body when said support is moved to closed position but permitting said resilient means to extend said finger member from the camera body when said support is moved to open position.

6. In a photographic camera, the combination with a camera body, a folding bed hinged to said camera body for movement to open and closed positions, and a shutter assembly carried by said bed and including an operating arm, of an actuator mounted for movement with respect to said bed and arranged, when said bed is in open position, to engage and actuate the shutter operating arm, a manually operable means on said camera body including a finger member normally extending therefrom, and an articulated connection between said actuator and said manually operable means and including a cam member on said actuator adapted when said bed is moved to closed position to move said manually operable means for retraction of said finger member toward said camera body.

7. In a photographic camera, the combination with a camera body, a folding bed hinged to said camera body for movement to open and closed positions, and a shutter assembly carried by said bed and including an operating arm, of an actuator mounted for movement with respect to said bed, including at one end an upright portion for actuating the shutter operating arm, and including at the other end an arcuate portion, a manually operable means on said camera body including a finger member normally extending therefrom, and an articulated connection formed by engagement of the arcuate portion on said actuator with said manually operable means, said arcuate portion acting upon closing of said folding bed to move said manually operable means for retraction of said finger member toward said camera body.

8. In a photographic camera, the combination with a camera body, a folding bed hinged to said camera body for movement to open and closed positions, and a shutter assembly carried by said bed and including an operating arm, of an actuator mounted for longitudinal movement with respect to said bed, including at one end an upright portion for actuating the shutter operating arm, and including at the other end an arcuate portion, and a manually operable means comprising a slide slidably mounted on said camera body, a finger member normally extending from said camera body, and a bell crank pivoted on said camera body and operatively connected to said slide and said finger member, said arcuate portion of said actuator operatively engaging said slide to move the same and retract said finger member toward the camera body when said bed is moved to closed position.

9. In a photographic camera, the combination with a camera body, a folding bed hinged to said camera body for movement to open and closed positions, and a shutter assembly carried by said bed and including an operating arm, of an actuator rod including at one end an upright portion for actuating the shutter operating arm, an arcuate portion at the other end, and a shoulder intermediately of said rod, guide members on said bed, supporting said actuator rod for movement longitudinally of said bed and adapted to abut said shoulder to limit the outward movement of said rod, a manually operable means on said camera body including a finger member normally extending therefrom, and an articulated connection formed by engagement of said other end of said actuator rod with said manually operable means and functioning upon closing of the bed and by virtue of the shoulder of said rod abutting a guide member and said arcuate portion moving said manually operable means to retract said finger member toward said camera body.

10. In a photographic camera, the combination with a camera body, a folding bed hinged to said camera body for movement to open and closed positions, and a shutter assembly carried by said bed and including an operating arm, of an actuator mounted for longitudinal movement with respect to said bed, including at one end an upright portion for actuating the shutter operating arm, and including at the other end an arcuate portion, an abutment on said bed for limiting the longitudinal movement of said actuator, a manually operable means on said camera body including a finger member normally extending therefrom, and an articulated connection between said other end of said actuator and said manually operable means whereby movement of said bed to closed position causes said arcuate portion of the actuator to move said manually operable means and retract said finger member toward said camera body.

11. In a photographic camera, the combination with a camera body, a folding bed hinged to said camera body for movement to open and closed positions, and a shutter assembly carried by said bed and including an operating arm, of an actuator mounted for movement with respect to said bed and arranged, when said bed is in open position, to engage and actuate the shutter operating arm, a manually operable means on said camera body operatively connected to said actuator and including a finger member normally extending from the camera body, and a cam member on said folding bed, for engaging said manually operable means and for moving said finger member into said camera body when said folding bed is moved to closed position.

12. In a photographic camera, the combination with a camera body, a folding bed hinged to said camera body for movement to open and closed positions, and a shutter assembly carried by said bed and including an operating arm, of an actuator mounted for movement with respect to said bed and arranged, when said bed is in open position, to engage and actuate the shutter operating arm, a manually operable means including a member operatively connected to said actuator and slidably mounted on said camera body and including a finger member normally extending from said camera body, and a cam member mounted upon said folding bed, for engaging the slidable member of said manually operable means, and upon movement of said bed to closed position for moving said means to retract said finger member into said camera body.

13. In a photographic camera, the combination with a camera body, a folding bed hinged to said camera body for movement to open and closed positions, and a shutter assembly carried by said bed and including an operating arm, of an actuator rotatably mounted on said bed for rotation about an axis extending longitudinally of said bed and having a portion for engaging and actuating said shutter operating arm when said bed is in open position, a manually operable means on said camera body operatively connected to said actuator and including a finger member normally extending from the camera body, and a cam member on said folding bed, for engaging said manually operable means and for moving said finger member into said camera body when said folding bed is moved to closed position.

CHESTER W. CRUMRINE.